United States Patent
Mochizuki et al.

(10) Patent No.: US 9,352,631 B2
(45) Date of Patent: May 31, 2016

(54) VEHICLE HEIGHT ADJUSTING DEVICE AND ASSEMBLING METHOD FOR VEHICLE HEIGHT ADJUSTING DEVICE

(71) Applicant: KAYABA INDUSTRY CO., LTD., Tokyo (JP)

(72) Inventors: Takahisa Mochizuki, Gifu (JP); Yuki Amano, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/439,671

(22) PCT Filed: Nov. 15, 2013

(86) PCT No.: PCT/JP2013/080892
§ 371 (c)(1),
(2) Date: Apr. 30, 2015

(87) PCT Pub. No.: WO2014/080842
PCT Pub. Date: May 30, 2014

(65) Prior Publication Data
US 2015/0290992 A1    Oct. 15, 2015

(30) Foreign Application Priority Data
Nov. 20, 2012  (JP) ................. 2012-254440

(51) Int. Cl.
| | |
|---|---|
| *B60G 15/06* | (2006.01) |
| *B60G 17/027* | (2006.01) |
| *F16F 9/46* | (2006.01) |
| *F16F 9/32* | (2006.01) |

(52) U.S. Cl.
CPC ............ *B60G 15/062* (2013.01); *B60G 17/027* (2013.01); *B60G 17/0272* (2013.01); *F16F 9/32* (2013.01); *F16F 9/46* (2013.01); *B60G 2202/31* (2013.01); *B60G 2202/312* (2013.01); *B60G 2206/91* (2013.01); *B60G 2500/30* (2013.01)

(58) Field of Classification Search
CPC ............. B60G 15/062; B60G 17/027; B60G 2500/30; B60G 2260/91; B60G 2202/31; B60G 2202/3166
See application file for complete search history.

(56) References Cited

U.S. PATENT DOCUMENTS

| | | | | |
|---|---|---|---|---|
| 4,934,729 A | * | 6/1990 | Murata ................. | B60G 3/265 |
| | | | | 280/124.136 |
| 2009/0095584 A1 | * | 4/2009 | Kondo .................. | B60G 11/15 |
| | | | | 188/267 |

FOREIGN PATENT DOCUMENTS

| | | | | |
|---|---|---|---|---|
| JP | 04-131531 A | | 5/1992 | |
| JP | 06-067942 U | | 9/1994 | |
| JP | 10-299811 A | | 11/1998 | |
| JP | 2006044482 A | * | 2/2006 | ............ B60G 15/06 |
| JP | 2010-149550 A | | 7/2010 | |

* cited by examiner

Primary Examiner — Faye M Fleming
(74) Attorney, Agent, or Firm — Rabin & Berdo, P.C.

(57) ABSTRACT

A vehicle height adjusting device includes an annular movable spring bearing mounted on the outer periphery of an outer tube of a shock absorber, the movable spring bearing being configured to support one side end of a suspension spring for biasing the shock absorber in an extending direction, a driving mechanism configured to drive the movable spring bearing in an axial direction of the shock absorber, an auxiliary spring configured to bias the movable spring bearing toward the suspension spring, and a stopper member mounted on the outer periphery of the outer tube of the shock absorber, the stopper member being configured to restrict a movement of the movable spring bearing toward the suspension spring.

7 Claims, 4 Drawing Sheets

VEHICLE HEIGHT ADJUSTING DEVICE AND ASSEMBLING METHOD FOR VEHICLE HEIGHT ADJUSTING DEVICE

TECHNICAL FIELD

The present invention relates to a vehicle height adjusting device and an assembling method for vehicle height adjusting device.

BACKGROUND ART

Generally, a shock absorber for generating a damping force and a suspension spring for biasing the shock absorber in an extending direction are provided in parallel between a vehicle body and a wheel in a vehicle to suppress the transmission of a shock caused by road surface unevenness to the vehicle body by absorbing the shock caused by the road surface unevenness by the suspension spring and suppressing extending and contracting motions of the suspension spring associated with shock absorption by the shock absorber.

Further, if the vehicle is loaded with a large amount of freight and/or many passengers, compression amounts of the suspension spring and the shock absorber may become large and a vehicle height may become too low. On the contrary, if the vehicle is loaded with a small amount of freight and/or a few passengers, the compression amounts of the suspension spring and the shock absorber may become small and the vehicle height may become too high. Accordingly, a vehicle height adjusting device for adjusting the vehicle height is installed in a vehicle in some cases.

For example, a vehicle height adjusting device disclosed in JP2010-149550A includes a movable spring bearing mounted on the outer periphery of an outer tube of a shock absorber and configured to support one side end of a suspension spring for biasing the shock absorber in an extending direction, and a driving mechanism configured to drive the movable spring bearing in an axial direction of the shock absorber.

Accordingly, if a vehicle height becomes too low, the driving mechanism is actuated to drive the movable spring bearing toward the suspension spring, whereby the vehicle height can be increased by extending the shock absorber. Further, if the vehicle height becomes too high, the driving mechanism is actuated to drive the movable spring bearing toward a side opposite to the suspension spring, whereby the vehicle height can be decreased by compressing the shock absorber.

SUMMARY OF INVENTION

However, in the case of an adjustment in a direction to increase the vehicle height by the above vehicle height adjusting device, a large force is necessary to drive the movable spring bearing toward the suspension spring since a load of the suspension spring is large.

Accordingly, it is considered to sandwich the movable spring bearing by the suspension spring and an auxiliary spring and bias the movable spring bearing toward the suspension spring, i.e. in a direction to compress the suspension spring by the auxiliary spring in order to enable the movable spring bearing to be driven toward the suspension spring also when the load of the suspension spring is large. However, in this case, the movable spring bearing moves in the axial direction and needs to be sandwiched by the suspension spring and the auxiliary spring, wherefore it becomes difficult to assemble the suspension spring and the auxiliary spring.

The present invention was developed in view of the above problem and aims to provide a vehicle height adjusting device capable of facilitating an assembling operation of a suspension spring and an auxiliary spring even if the auxiliary spring is provided and an assembling method for vehicle height adjusting device.

According to one aspect of the present invention, a vehicle height adjusting device includes an annular movable spring bearing mounted on the outer periphery of an outer tube of a shock absorber, the movable spring bearing being configured to support one side end of a suspension spring for biasing the shock absorber in an extending direction, a driving mechanism configured to drive the movable spring bearing in an axial direction of the shock absorber, an auxiliary spring configured to bias the movable spring bearing toward the suspension spring, and a stopper member mounted on the outer periphery of the outer tube of the shock absorber, the stopper member being configured to restrict a movement of the movable spring bearing toward the suspension spring.

According to another aspect of the present invention, a vehicle height adjusting device includes a guide tube held on the outer periphery of an outer tube of a shock absorber, an annular movable spring bearing mounted on the outer tube of the shock absorber via the guide tube, the movable spring bearing being configured to support one side end of a suspension spring for biasing the shock absorber in an extending direction, a driving mechanism configured to drive the movable spring bearing in an axial direction of the shock absorber, an auxiliary spring configured to bias the movable spring bearing toward the suspension spring, a stopper member mounted on the outer tube of the shock absorber via the guide tube, the stopper member being configured to restrict a movement of the movable spring bearing toward the suspension spring, and a supporting member fixed to the outer tube of the shock absorber and bulging outwardly from the outer tube of the shock absorber. An assembling method for the vehicle height adjusting device includes inserting the outer tube of the shock absorber into the guide tube after a jack assembly is constituted by mounting the movable spring bearing, the auxiliary spring, the stopper member and the driving mechanism on the outer periphery of the guide tube, and supporting one side end of the suspension spring on the movable spring bearing, pressing the jack assembly against the supporting member by the suspension spring and fixing the jack assembly to the outer tube of the shock absorber.

DESCRIPTION OF EMBODIMENT

Hereinafter, an embodiment of the present invention is described with reference to the accompanying drawings.

Figure 1:
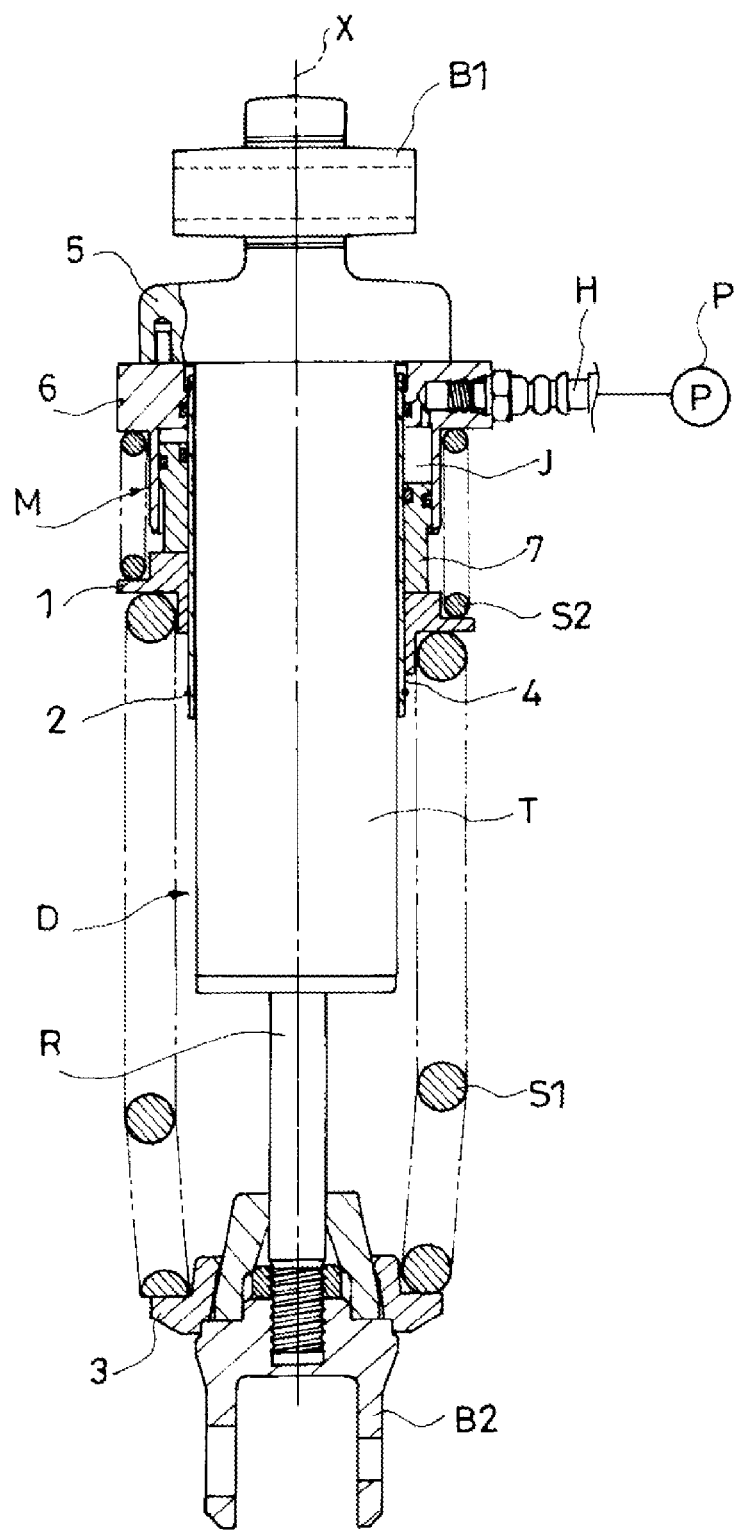
FIG. 1 is a front view partly in section showing a state where a vehicle height adjusting device according to an embodiment of the present invention and a suspension spring are assembled with a shock absorber.

As shown in FIG. 1, a vehicle height adjusting device according to the present embodiment is mounted on the outer periphery of an outer tube T of a shock absorber D and includes an annular movable spring bearing 1 for supporting one side end (upper end in FIG. 1) of a suspension spring S1 for biasing the shock absorber D in an extending direction, a driving mechanism M for driving the movable spring bearing 1 in an axial direction of the shock absorber D, an auxiliary spring S2 for biasing the movable spring bearing 1 toward the suspension spring S1 (lower side in FIG. 1) and a snap ring (stopper member) 2 on a wheel side for restricting a movement of the movable spring bearing 1 toward the suspension spring (lower side in FIG. 1).

The shock absorber D includes the outer tube T coupled to a vehicle body side via a vehicle body side bracket B1 and a piston rod R coupled to a wheel side via a wheel side bracket B2 and is set to be of an inverted type. The piston rod R is inserted into the outer tube T movably in the axial direction, and the shock absorber D extends and contracts by projecting and retracting movements of the piston rod R into and from the outer tube T.

The shock absorber D can suppress extending and contracting motions of the suspension spring S1 by generating a predetermined damping force as it extends and contracts. Various proposals have been made on a configuration of the shock absorber D for generating a damping force and any configuration may be adopted. Thus, the detailed configuration of the shock absorber D is not described here. Further, although the shock absorber D is set to be of the inverted type in the present embodiment, it may be set to be of an upright type by coupling the piston rod R to the vehicle body side and coupling the outer tube T to the wheel side.

The suspension spring S1 is mounted on the outer periphery of the shock absorber D. In the present embodiment, the suspension spring S1 is a coil spring. The suspension spring S1 is interposed between the movable spring bearing 1 coupled to the vehicle body side and a fixed spring bearing 3 coupled to the wheel side and biases the movable spring bearing 1 and the fixed spring bearing 3 in directions to separate them from each other. Thus, the suspension spring S1 can bias the shock absorber D in such an extending direction where the piston rod R comes out from the outer tube T.

As described above, the movable spring bearing 1 coupled to the vehicle body side is annularly formed, mounted on the outer periphery of the outer tube T of the shock absorber D movably in the axial direction and constitutes the vehicle height adjusting device for adjusting a vehicle height by extending and contracting the shock absorber D. Further, the fixed spring bearing 3 is annularly formed, supported by the wheel side bracket B2 and pressed against the wheel side bracket B2 by the suspension spring S1 so as not to move in the axial direction.

In the present embodiment, the vehicle height adjusting device includes the movable spring bearing 1, the driving mechanism M for driving the movable spring bearing 1 in the axial direction of the shock absorber D, the auxiliary spring S2 for biasing the movable spring bearing 1 toward the suspension spring S1, the snap ring (stopper member) 2 on the wheel side mounted on the outer periphery of the outer tube T and configured to restrict a movement of the movable spring bearing 1 toward the suspension spring S1 (lower side in FIG. 1) as described above. In addition, the vehicle height adjusting device includes a guide tube 4 formed into a tubular shape and held on the outer periphery of the outer tube T and a supporting member 5 fixed to the outer tube T of the shock absorber D and bulging outwardly from the outer tube T.

Figure 2:
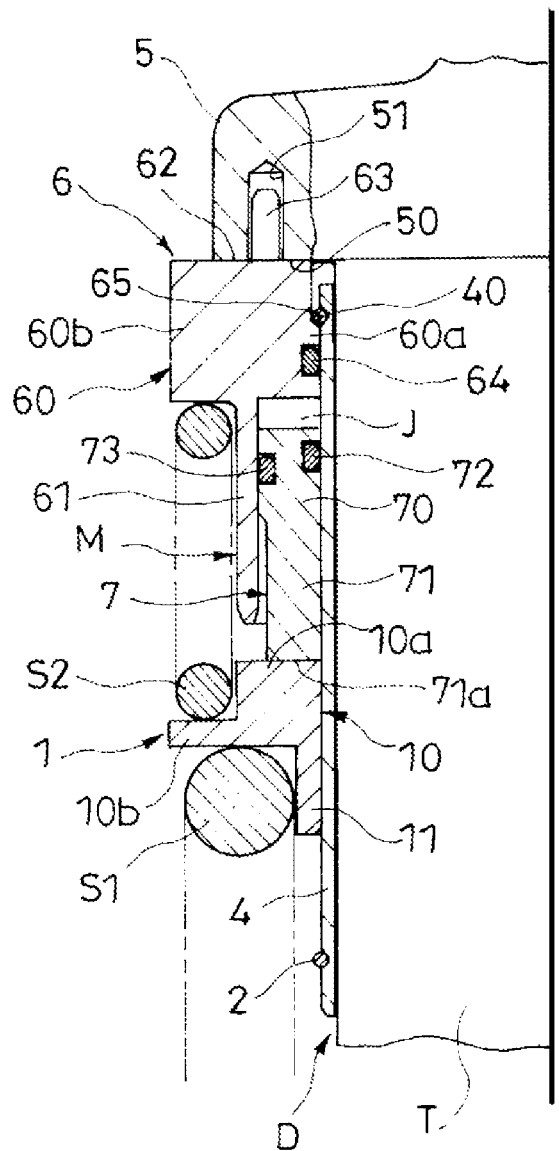
FIG. 2 is a view enlargedly showing a main part of FIG. 1.

The movable spring bearing 1 is made movable in the axial direction of the shock absorber D by sliding in contact with the outer peripheral surface of the guide tube 4, and mounted on the outer tube T of the shock absorber D via the guide tube 4. Further, as shown in FIG. 2, the movable spring bearing 1 includes an annular bearing portion 10 for supporting a vehicle body side end (one side end) of the suspension spring S1 and a tubular guide portion 11 erected substantially perpendicularly from the inner peripheral edge of a surface of the bearing portion 10 on the side of the suspension spring S1 (lower surface in FIG. 2), and supports the inner periphery of a vehicle body side end portion (one side end portion) of the suspension spring S1 by the guide portion 11. Further, the bearing portion 10 is so formed that an inner peripheral portion 10*a* is thicker than an outer peripheral portion 10*b* and projects toward a side opposite to the suspension spring S1 (upper side in FIG. 2).

The driving mechanism M for driving the movable spring bearing 1 includes a housing 6 fixed to a side opposite to the suspension spring S1 of the movable spring bearing 1 (upper side in FIGS. 1 and 2) on the outer periphery of the guide tube 4, a jack chamber J formed between the housing 6 and the guide tube 4 and filled with working fluid and a jack piston 7 held in contact with a side of the movable spring bearing 1 opposite to the suspension spring 1 (upper side in FIGS. 1 and 2) and configured to close an opening of the jack chamber J on the side of the suspension spring S1 (lower side in FIGS. 1 and 2) by being movably inserted between the housing 6 and the guide tube 4. Further, a pump P (FIG. 1) for sucking and discharging the working fluid into and from the jack chamber is connected to the driving mechanism M.

As shown in FIG. 2, the housing 6 is formed into a bottomed tubular shape, includes an annular bottom portion 60 and a tubular portion 61 having a tubular shape and erected substantially perpendicularly from a surface of the bottom portion 60 on the side of the suspension spring S1 (lower surface in FIG. 2) and is so arranged that the bottom portion 60 is facing toward the supporting member 5 (upper side in FIG. 2) and the tubular portion 61 is facing toward the suspension spring S1 (lower side in FIG. 2). Further, the housing 6 is fixed by being pressed against the supporting member 5 by the suspension spring S1 and a pin 63 erected from a joint surface 62 of the housing 6 with which the supporting member 5 is in contact is mounted on the housing 6.

The tubular portion 61 of the housing 6 is arranged with a predetermined clearance defined between the tubular portion 61 and the outer periphery of the guide tube 4, and working fluid made of non-compressive liquid is stored in this clearance, thereby forming the annular jack chamber J.

The bottom portion 60 of the housing 6 is such that an inner peripheral portion 60*a* projects inwardly from the tubular portion 61 and an annular seal 64 is mounted on the inner periphery. Since the seal 64 is held in close contact with the outer peripheral surface of the guide tube 4, the outflow of the working fluid in the jack chamber J from the clearance between the bottom portion 60 of the housing 6 and the guide tube 4 can be prevented by closing the opening of the jack chamber J opposite to the suspension spring S1 (upper side in FIG. 2) in a liquid-tight manner by the inner peripheral portion 60*a* of the bottom portion 60.

Further, the bottom portion 60 of the housing 6 is formed to have a larger inner diameter on the side of the supporting member 5 (upper side in FIG. 2) than on the other part and a step 65 is formed on the inner peripheral surface of the bottom portion 60. Furthermore, the bottom portion 60 is such that an outer peripheral portion 60*b* bulges outwardly from the tubular portion 61.

The jack piston 7 includes an annular piston portion 70 for closing the opening of the jack chamber J on the side of the suspension spring S1 (lower side in FIG. 2) by being movably inserted between the tubular portion 61 of the housing 6 and the guide tube 4 and an extending portion 71 connected to a part of the piston portion 70 on the side of the suspension spring S1 (lower side in FIG. 2).

Annular seals 72, 73 are respectively mounted on the inner and outer peripheries of the piston portion 70, the seal 72 on an inner peripheral side slides in contact with the outer peripheral surface of the guide tube 4 and the seal 73 on an outer peripheral side slides in contact with the inner peripheral surface of the tubular portion 61. Thus, the jack piston 7 can close the opening of the jack chamber J on the side of the suspension spring S1 (lower side in FIG. 2) in a liquid-tight manner by sliding in contact with the outer peripheral surface of the guide tube 4 via the seal 72 on the inner peripheral side and sliding in contact with the inner peripheral surface of the tubular portion 61 via the seal 73 on the outer peripheral side.

Further, assuming that a state where the jack piston 7 is most inserted in the housing 6 is a jack minimum position and a state where the jack piston 7 is most retracted from the housing 6 is a jack maximum position in a movable range of the jack piston 7, an end portion 71a of the extending portion 71 on the side of the suspension spring S1 projects downwardly from the tubular portion 61 of the housing 6 also at the jack minimum position where the movable spring bearing 1 is most retracted. That is, the jack piston 7 is so set that the end portion 71a of the extending portion 71 on the side of the suspension spring S1 constantly projects from the housing 6.

As shown in FIG. 1, the pump P is connected to the jack chamber J via a hose H and sucks and discharges the working fluid into and from the jack chamber J by being driven by an unillustrated motor. It should be noted that various proposals have been made on the pump P for sucking and discharging the working fluid and any configuration may be adopted. Thus, the detailed configuration of the pump P is not described here. Further, although the pump P is an electric pump to be driven by the motor in the present embodiment, it may be a manual pump to be manually driven.

The auxiliary spring S2 is a coil spring in the present embodiment. As shown in FIG. 2, the auxiliary spring S2 is arranged on the outer periphery of the tubular portion 61 of the housing 6 and interposed between the outer peripheral portion 10b of the bearing portion 10 of the movable spring bearing 1 and the outer peripheral portion 60b of the bottom portion 60 of the housing 6. Thus, the auxiliary spring S2 is arranged in series with the suspension spring S1 and acts in a direction to bias the movable spring bearing 1 toward the suspension spring S1 (lower side in FIG. 2) and compress the suspension spring S1.

Assuming that forces acting on the suspension spring S1 and the auxiliary spring S2 are loads, a load of the auxiliary spring S2 is maximized at the jack minimum position where the movable spring bearing 1 is most retracted in a state where the vehicle height adjusting device and the suspension spring S1 are assembled with the shock absorber D. The load of the auxiliary spring S2 at this time is referred to as an assembling-time maximum load of the auxiliary spring S2 below. Further, a load of the suspension spring S1 is minimized at the jack minimum position and when the shock absorber D is most extended in the state where the vehicle height adjusting device and the suspension spring S1 are assembled with the shock absorber D. The load of the suspension spring S1 at this time is referred to as an assembling-time minimum load of the suspension spring below.

Since the assembling-time maximum load of the auxiliary spring S2 is set to be smaller than the assembling-time minimum load of the suspension spring S1, the load of the auxiliary spring S2 is constantly smaller than that of the suspension spring S1 in the state where the vehicle height adjusting device and the suspension spring S1 are assembled with the shock absorber D. Thus, the movable spring bearing 1 is constantly maintained in a state pressed against and held in contact with the end portion 71a of the jack piston 7 on the side of the suspension spring S1 by the suspension spring S1 in the state where the vehicle the suspension spring S1 and the auxiliary spring S2 are assembled.

The guide tube 4 is formed into a tubular shape, has the outer tube T of the shock absorber D inserted thereinto and is arranged on the wheel side (lower side in FIGS. 1 and 2) of the supporting member 5 as described above. Further, as shown in FIG. 2, an annular groove (not denoted by a reference sign) extending in a circumference direction is formed on each of the outer peripheries of opposite end portions of the guide tube 4, and snap rings 2, 40 are respectively mounted in the grooves.

The snap ring 40 on the vehicle body side (upper side in FIG. 2) is set to be caught by the step 65 formed on the inner peripheral surface of the bottom portion 60 of the housing 6, and the guide tube 4 is held in a state suspended from the housing 6 via the snap ring 40.

Further, the movable spring bearing 1 and the jack piston 7 slide in contact with the guide tube 4 between the snap rings 2, 40. In the present embodiment, the snap ring 2 on the wheel side is a stopper member mounted on the outer periphery of the outer tube T via the guide tube 4 and configured to restrict a movement of the movable spring bearing 1 toward the suspension spring S1 (lower side in FIG. 2).

The snap ring 2 on the wheel side, which is a stopper member, is provided at such a position as not to come into contact with the movable spring bearing 1 even at the jack maximum position where the movable spring bearing 1 is most advanced in a state where both the suspension spring S1 and the auxiliary spring S2 are assembled, and set not to hinder a movement of the movable spring bearing 1.

As described above, the supporting member 5 is fixed to the outer tube T of the shock absorber D and bulges outwardly from the outer tube T. The supporting member 5 is arranged on an end portion of the outer tube T on the vehicle body side (upper end portion in FIGS. 1 and 2). It should be noted that the supporting member 5 has only to be fixed to the outer tube T so as not to move and the supporting member 5 and the outer tube T may be joined by any method such as screwing, welding, fitting or integral forming. Further, as shown in FIG. 2, the supporting member 5 is formed with a pin insertion hole 51 perforated on a joint surface 50 with which the housing 6 is in contact. By inserting the pin 63 erected on the housing 6 into the pin insertion hole 51, the rotation of the housing 6 and the supporting member 5 can be stopped. In the present embodiment, a rotation stopping mechanism is constituted by the pin 63 and the pin insertion hole 51.

Next, an assembling method for the vehicle height adjusting device according to the present embodiment is described.

Figure 3:
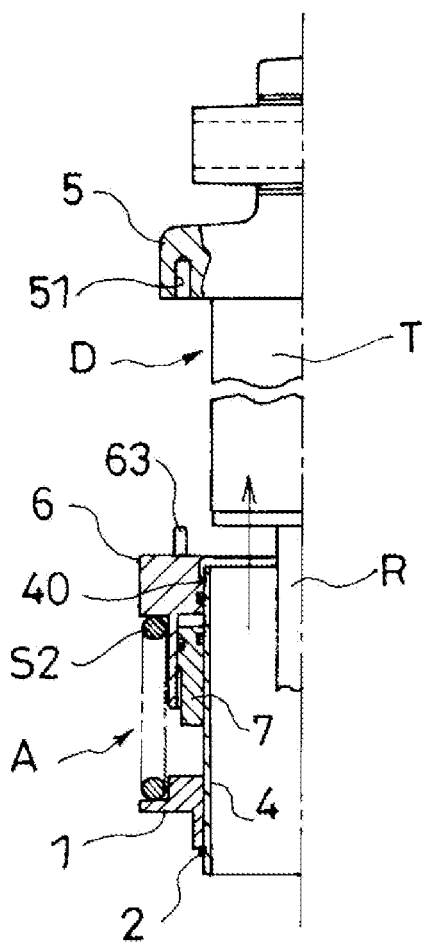
FIG. 3 is a view showing a step of assembling the vehicle height adjusting device according to the embodiment of the present invention.

First, as shown in FIG. 3, the movable spring bearing 1, the auxiliary spring S2, the snap rings 2, 40, the housing 6 and the jack piston 7 are mounted on the outer periphery of the guide tube 4, thereby constituting a jack assembly A. At this time, the movable spring bearing 1 is retained by the snap ring (stopper member) 2 on the wheel side and the housing 6 is also retained by the snap ring 40 on the vehicle body side. Thus, even if the movable spring bearing 1 and the housing 6 are biased in directions to separate from each other by the auxiliary spring S2, the movable spring bearing 1 and the housing 6 do not come off from the guide tube 4 and a structure as the jack assembly A can be maintained.

Then, the outer tube T of the shock absorber D having the supporting member 5 fixed thereto is inserted into the guide tube 4 with an end opposite to the supporting member 5 (lower end in FIG. 3) in the lead and the pin 63 is inserted into the pin insertion hole 51.

Subsequently, the suspension spring S1 is interposed between the fixed spring bearing 3 (FIG. 1) mounted on the wheel side bracket B2 fixed to the piston rod R and the movable spring bearing 1 of the jack assembly A. At this time, the jack assembly A is pressed against the supporting member 5 by a spring force of the suspension spring S1 and fixed to the outer tube T of the shock absorber D.

Next, the operation of the vehicle height adjusting device according to the present embodiment is described.

When the pump P is driven to supply the working fluid to the jack chamber J, the jack piston 7 is pushed out from the housing 6. In this way, the outer tube T is pushed upwardly in FIG. 1 and the shock absorber D is extended, wherefore the vehicle height can be increased. A state of the vehicle height adjusting device at the jack maximum position where the movable spring bearing 1 is most advanced is shown to the right of a center axis X of FIG. 1.

When the pump P is driven to discharge the working fluid from the jack chamber J, the jack piston 7 is pushed into the housing 6. In this way, the outer tube T is pushed downwardly in FIG. 1 and the shock absorber D is compressed, wherefore the vehicle height can be decreased. A state of the vehicle height adjusting device at the jack minimum position where the movable spring bearing 1 is most retracted is shown to the left of the center axis X of FIG. 1.

Next, functions and effects of the vehicle height adjusting device of the present embodiment are described with reference to a comparative example of the present embodiment.

Figure 4:
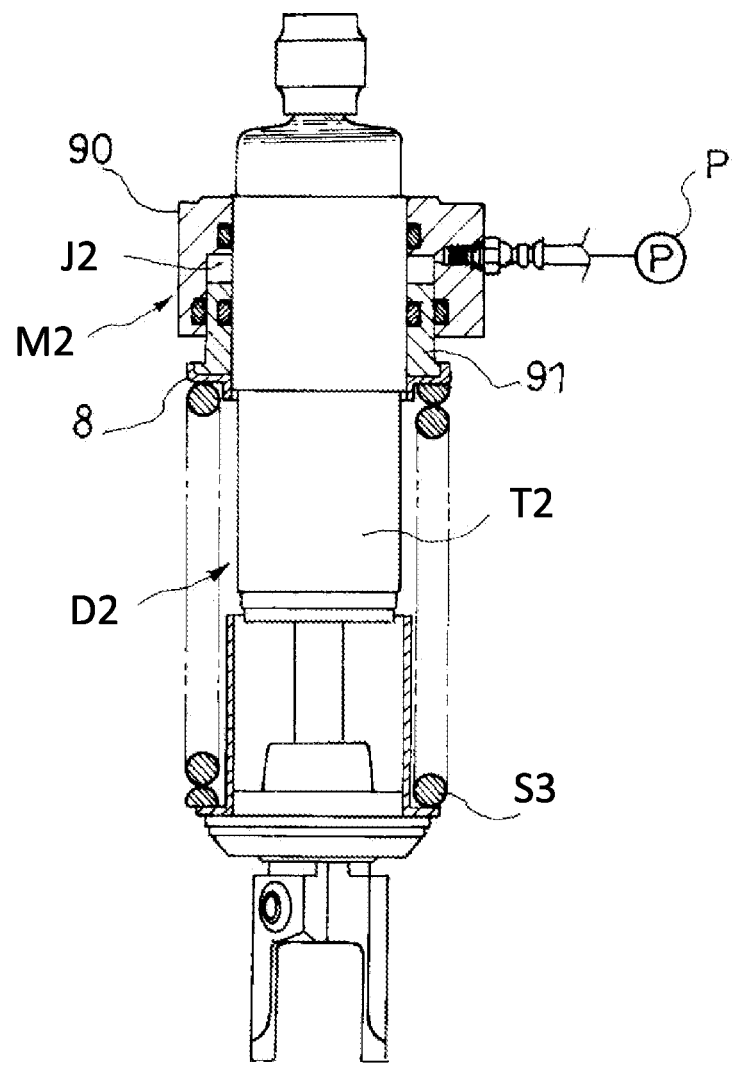
FIG. 4 is a front view partly in section showing a state where a vehicle height adjusting device of a comparative example and a suspension spring are assembled with a shock absorber.

FIG. 4 is a front view partly in section showing a state where a vehicle height adjusting device of the comparative example and a suspension spring are assembled with a shock absorber.

As shown in FIG. 4, the vehicle height adjusting device of the comparative example is mounted on the outer periphery of an outer tube T2 of a shock absorber D2 and includes a movable spring bearing 8 for supporting one side end (upper end in FIG. 4) of a suspension spring S3 for biasing the shock absorber D2 in an extending direction and a driving mechanism M2 for driving the movable spring bearing 8 in an axial direction of the shock absorber D2.

The driving mechanism M2 of the comparative example includes an annular housing 90 fixed to a side opposite to the suspension spring S3 of the movable spring bearing 8 (upper side in FIG. 4) on the outer periphery of the outer tube T2, a jack chamber J2 formed between the housing 90 and the outer tube T2 and filled with working fluid and a jack piston 91 connected to a side of the movable spring bearing 8 opposite to the suspension spring S3 (upper side in FIG. 4) and configured to close an opening of the jack chamber J2 on the side of the suspension spring S3 (lower side in FIG. 4) by being movably inserted between the housing 90 and the outer tube T2. Further, a pump P for sucking and discharging the working fluid into and from the jack chamber J2 is connected to the driving mechanism M2.

Thus, if the vehicle height becomes too low, the jack piston 91 is pushed out from the housing 90 and the shock absorber D2 is extended by supplying the working fluid into the jack chamber J2 by the pump P, whereby the vehicle height can be increased. Further, if the vehicle height becomes too high, the jack piston 91 is pushed into the housing 90 and the shock absorber D2 is compressed by discharging the working fluid from the jack chamber J2 by the pump P, whereby the vehicle height can be decreased.

However, in the case of an adjustment in a direction to increase the vehicle height by the vehicle height adjusting device of the comparative example, a large force is necessary to drive the pump P, supply the working fluid into the jack chamber J2 and push out the jack piston 91 since a load of the suspension spring S3 is large.

Accordingly, it is considered to sandwich the movable spring bearing 8 by the suspension spring S3 and an auxiliary spring and bias the movable spring bearing 8 toward the suspension spring S3, i.e. in a direction to compress the suspension spring S3 by the auxiliary spring in order to facilitate the supply of the working fluid into the jack chamber J2 also when the load of the suspension spring S3 is large. However, in this case, the movable spring bearing 8 moves in the axial direction and needs to be sandwiched by the suspension spring S3 and the auxiliary spring, wherefore it becomes difficult to assemble the suspension spring S3 and the auxiliary spring.

Contrary to this, the vehicle height adjusting device according to the present embodiment includes the annular movable spring bearing 1 mounted on the outer periphery of the outer tube T of the shock absorber D and configured to support one side end (upper end in FIG. 1) of the suspension spring S1 for biasing the shock absorber D in the extending direction, the driving mechanism M for driving the movable spring bearing 1 in the axial direction of the shock absorber D, the auxiliary spring S2 for biasing the movable spring bearing 1 toward the suspension spring S1 (lower side in FIG. 1) and the snap ring (stopper member) 2 on the wheel side mounted on the outer periphery of the outer tube T and configured to restrict a movement of the movable spring bearing 1 toward the suspension spring S1 (lower side in FIG. 1).

According to this, even if the movable spring bearing 1 is biased toward the suspension spring S1 (lower side in FIG. 1) by the auxiliary spring S2 when the suspension spring S1 is assembled, a movement of the movable spring bearing 1 can be restricted by the snap ring 2 on the wheel side, which is a stopper member. Thus, the suspension spring S1 can be easily assembled and an assembling operation of the suspension spring S1 and the auxiliary spring S2 can be facilitated.

Further, the snap ring (stopper member) 2 can restrict a movement of the movable spring bearing 1 toward the suspension spring S1 and also restrict a movement of the jack piston 7 toward the suspension spring S1.

Accordingly, by setting the jack piston 7 so as not to come out of the housing 6 in a state where the movable spring bearing 1 is in contact with the snap ring (stopper member) 2 and the jack piston 7 is in contact with the movable spring bearing 1, it can be prevented that the jack piston 7 comes out of the housing 6 and the working fluid leaks out from the jack chamber J even if the working fluid is excessively supplied to the jack chamber J and the jack piston 7 is retracted from the housing 6 beyond the jack maximum position.

Further, by providing the auxiliary spring S2, the working fluid can be easily supplied to the jack chamber J also when the load of the suspension spring S1 is large.

Furthermore, in the present embodiment, the snap ring 2 on the wheel side, which is a stopper member, is provided at such a position as not to come into contact with the movable spring bearing 1 in the state where the suspension spring S1 and the auxiliary spring S2 are assembled.

Accordingly, the snap ring (stopper member) 2 on the wheel side does not hinder a movement of the movable spring bearing 1 in an assembling completed state where both the auxiliary spring S2 and the suspension spring S1 are assembled. Further, the snap ring (stopper member) 2 on the wheel side can restrict a movement of the movable spring bearing 1 toward the suspension spring S1 (lower side in FIG. 1) in a state where the suspension spring S1 is not assembled.

Further, in the present embodiment, the vehicle height adjusting device includes the guide tube 4 held on the outer periphery of the outer tube T, and the movable spring bearing 1 and the snap ring (stopper member) 2 on the wheel side are mounted on the above outer tube T via the guide tube 4.

Accordingly, it is sufficient to apply surface processing to smoothen the outer peripheral surface of the guide tube 4 as a slide-contact surface since the movable spring bearing 1 slides in contact with the outer peripheral surface of the guide tube 4. Surface processing can be easily performed as compared with the case where the outer peripheral surface of the outer tube T is surface-processed as a slide-contact surface.

Further, the movable spring bearing 1 and the snap ring 2 on the wheel side can be held on the outer periphery of the guide tube 4 when the movable spring bearing 1 and the snap ring (stopper member) 2 on the wheel side are assembled with the outer tube T of the shock absorber D after being assembled in advance to constitute the jack assembly A as in the present embodiment. Thus, the movable spring bearing 1 and the snap ring 2 on the wheel side can be easily integrated as the jack assembly A. This is particularly effective in the case of assembling the constituted jack assembly A with the outer tube T of the shock absorber D.

Furthermore, by mounting the snap ring (stopper member) 2 on the wheel side on the guide tube 4, the movable spring bearing 1 can be easily maintained in a range where the slide-contact surface of the guide tube 4 is formed. Thus, it can be suppressed that the movable spring bearing 1 is detached from the guide tube 4 and the inner peripheral surface of the guide tube 4 is damaged.

Further, in the present embodiment, the driving mechanism M includes the housing 6 fixed to the side opposite to the suspension spring S1 of the movable spring bearing 1 (upper side in FIG. 1) on the outer periphery of the guide tube 4, the jack chamber J formed between the housing 6 and the guide tube 4 and filled with the working fluid, and the jack piston 7 held in contact with the side of the movable spring bearing 1 opposite to the suspension spring S1 (upper side in FIG. 1) and configured to close the opening of the jack chamber J on the side of the suspension spring S1 (lower side in FIG. 1) by being movably inserted between the housing 6 and the guide tube 4. Furthermore, the vehicle height adjusting device includes the pump P for sucking and discharging the working fluid into and from the jack chamber J.

Accordingly, the movable spring bearing 1 can be easily driven via the jack piston 7 by sucking and discharging the working fluid into and from the jack chamber J and causing the jack piston 7 to project from and retract into the housing 6.

Further, if the jack piston 7 is in contact with the movable spring bearing 1 and not connected to the movable spring bearing 1 by fitting, adhesion or the like as in the present embodiment, the movable spring bearing 1 easily moves. Thus, it is particularly effective to restrict a movement of the movable spring bearing 1 by mounting the snap ring (stopper member) 2 on the wheel side.

Further, in the present embodiment, the vehicle height adjusting device includes the supporting member 5 fixed to the outer tube T and bulging outwardly from the outer tube T. The housing 6 is fixed to the outer tube T via the supporting member 5 by being pressed against the supporting member 5 by the suspension spring S1 and the guide tube 4 is mounted on the outer tube T via the housing 6 by being held in the state suspended from the inner periphery of the housing 6.

Accordingly, the housing 6 and the guide tube 4 can be fixed to the outer tube T of the shock absorber D by the spring force of the suspension spring S1 and can be easily assembled.

Further, in the present embodiment, the rotation of the housing 6 and the supporting member 5 are stopped by the rotation stopping mechanism (pin 63 and pin insertion hole 51).

Accordingly, even if the suspension spring S1 acts to rotate the housing 6 relative to the supporting member 5 as it extends and contracts when the housing 6 is fixed by being pressed against the supporting member 5 by the spring force of the suspension spring S1, i.e. when the housing 6 and the supporting member 5 are connected only by contact, such rotation can be hindered and the action of a load on the hose H linking the jack chamber J and the pump P can be suppressed.

Further, in the present embodiment, the housing 6 is formed into a bottomed tubular shape and includes the annular bottom portion 60 to be mounted on the outer periphery of the guide tube 4 in a liquid-tight manner and the tubular portion 61 erected substantially perpendicularly from the surface of the bottom portion 60 on the side of the suspension spring S1 (lower surface in FIG. 2) and having the jack chamber J formed between the tubular portion 61 and the guide tube 4, the outer peripheral portion 60b of the bottom portion 60 bulges outwardly from the tubular portion 61, and the auxiliary spring S2 is interposed between the outer peripheral portion 60b of the bottom portion 60 and the movable spring bearing 1 on the outer periphery of the tubular portion 61.

Accordingly, the assembling operation of the auxiliary spring S2 can be facilitated. Further since the auxiliary spring S2 is arranged on the outer periphery of the jack chamber J, the vehicle height adjusting device can be formed compactly.

Further, since being supported by the housing 6, the auxiliary spring S2 can be integrated with the movable spring bearing 1, the snap ring (stopper member) 2 on the wheel side, the guide tube 4, the housing 6 and the jack piston 7 and constitute the jack assembly A. This is particularly effective in the case of assembling the constituted jack assembly A with the outer tube T of the shock absorber D as in the present embodiment.

Further, in the present embodiment, after the jack assembly A is constituted by mounting the movable spring bearing 1, the auxiliary spring S2, the snap ring (stopper member) 2 on the wheel side, the housing 6 and the jack piston 7 on the outer periphery of the guide tube 4, the outer tube T is inserted into the guide tube 4, the one side end (upper end in FIG. 1) of the suspension spring S1 is supported on the movable spring bearing 1, and the jack assembly A is fixed to the outer tube T by being pressed against the supporting member 5 by the suspension spring S1.

Accordingly, the assembling operation can be facilitated as compared with the case where the movable spring bearing 1, the auxiliary spring S2, the snap ring (stopper member) 2 on the wheel side, the housing 6 and the jack piston 7 are respectively assembled after the guide tube 4 is assembled with the outer tube T of the shock absorber D.

Embodiments of the present invention were described above, but the above embodiments are merely examples of applications of the present invention, and the technical scope of the present invention is not limited to the specific constitutions of the above embodiments.

For example, although the stopper member is the snap ring 2 in the above embodiment, it may be other than a snap ring and may be, for example, a projection integrally molded on the guide tube 4 or the outer tube T.

Further, in the above embodiment, the movable spring bearing 1, the stopper member (snap ring 2 on the wheel side), the housing 6 and the jack piston 7 are mounted on the outer periphery of the guide tube 4 and these are mounted on the outer periphery of the outer tube T of the shock absorber D via the guide tube 4. However, they may be directly mounted on the outer tube T.

Further, the configuration of the driving mechanism M for driving the movable spring bearing 1 and the configurations and shapes of the housing 6 and the jack piston 7 constituting the driving mechanism M are not limited to the above ones and the configurations and shapes can be appropriately selected as long as the movable spring bearing 1 can be driven.

Further, in the above embodiment, the supporting member 5 to be fixed to the outer tube T of the shock absorber D is provided and the housing 6 is fixed to the outer tube T by being pressed against the supporting member 5 by the suspension spring S1. However, the method for fixing the housing 6 is not limited to this and the housing 6 may be fixed to the outer tube T by any method such as fitting, screwing, welding or integral forming.

Further, although the rotation of the housing 6 and the supporting member 5 is stopped by inserting the pin 63 erected on the housing 6 into the pin insertion hole 51 formed on the supporting member 5 in the above embodiment, the pin insertion hole 51 may be formed on the housing 6 and the pin 63 may be erected on the supporting member 5. Furthermore, the rotation of the housing 6 and the supporting member 5 may be stopped by a method other than the pin 63 and the pin insertion hole 51 and the configuration of the rotation stopping mechanism can be appropriately selected.

Further, although the suspension spring S1 and the auxiliary spring S2 are coil springs in the above embodiment, either one or both of them may be air spring(s). Furthermore, the mounted position of the auxiliary spring S2 is not limited to the above one and the auxiliary spring S2 may be arranged in the jack chamber J.

Further, although the movable spring bearing 1, the auxiliary spring S2, the stopper member (snap ring 2 on the wheel side), the housing 6 and the jack piston 7 are assembled with the outer tube T of the shock absorber D after being mounted on the outer periphery of the guide tube 4 in advance and integrated as the jack assembly A in the above embodiment, there is no limitation to this and the assembling method can be appropriately selected.

With respect to the above description, the contents of application No. 2012-254440, with a filing date of Nov. 20, 2012 in Japan, are incorporated herein by reference.

The invention claimed is:

1. A vehicle height adjusting device, comprising:
an annular movable spring bearing mounted on the outer periphery of an outer tube of a shock absorber, the movable spring bearing being configured to support one side end of a suspension spring for biasing the shock absorber in an extending direction;
a driving mechanism configured to drive the movable spring bearing in an axial direction of the shock absorber;
an auxiliary spring configured to bias the movable spring bearing toward the suspension spring; and
a stopper member mounted on the outer periphery of the outer tube of the shock absorber, the stopper member being configured to restrict a movement of the movable spring bearing toward the suspension spring, wherein:
the stopper member is provided at such a position as not to come into contact with the movable spring bearing in a state where the suspension spring and the auxiliary spring are assembled.

2. The vehicle height adjusting device according to claim 1, further comprising:
a guide tube held on the outer periphery of the outer tube of the shock absorber, wherein:
the movable spring bearing and the stopper member are mounted on the outer tube of the shock absorber via the guide tube.

3. The vehicle height adjusting device according to claim 2, wherein:
the driving mechanism comprises:
a housing fixed to a side opposite to the suspension spring of the movable spring bearing on the outer periphery of the guide tube;
a jack chamber formed between the housing and the guide tube and filled with working fluid; and
a jack piston held in contact with a side of the movable spring bearing opposite to the suspension spring, the jack piston being configured to close an opening of the jack chamber on a side of the suspension spring by being movably inserted between the housing and the guide tube; and
the vehicle height adjusting device further comprises a pump configured to suck and discharge the working fluid into and from the jack chamber.

4. The vehicle height adjusting device according to claim 3, further comprising:
a supporting member fixed to the outer tube of the shock absorber and bulging outwardly from the outer tube of the shock absorber, wherein:
the housing is fixed to the outer tube of the shock absorber via the supporting member by being pressed against the supporting member by the suspension spring; and
the guide tube is mounted on the outer tube of the shock absorber via the housing by being held in a state suspended from the inner periphery of the housing.

5. The vehicle height adjusting device according to claim 4, further comprising:
a rotation stopping mechanism configured to stop rotation of the housing and the supporting member.

6. The vehicle height adjusting device according to claim 3, wherein:
the housing comprises:
an annular bottom portion formed into a bottomed tubular shape and mounted on the outer periphery of the guide tube in a liquid-tight manner; and
a tubular portion erected on a surface of the bottom portion on the side of the suspension spring and forming the jack chamber between the tubular portion and the guide tube;
an outer peripheral portion of the bottom portion bulges outwardly from the tubular portion; and
the auxiliary spring is interposed between the outer peripheral portion of the bottom portion and the movable spring bearing on the outer periphery of the tubular portion.

7. An assembling method for a vehicle height adjusting device, the vehicle height adjusting device comprising:
a guide tube held on the outer periphery of an outer tube of a shock absorber;
an annular movable spring bearing mounted on the outer tube of the shock absorber via the guide tube, the movable spring bearing being configured to support one side end of a suspension spring for biasing the shock absorber in an extending direction;

a driving mechanism configured to drive the movable spring bearing in an axial direction of the shock absorber;

an auxiliary spring configured to bias the movable spring bearing toward the suspension spring;

a stopper member mounted on the outer tube of the shock absorber via the guide tube, the stopper member being configured to restrict a movement of the movable spring bearing toward the suspension spring; and a supporting member fixed to the outer tube of the shock absorber and bulging outwardly from the outer tube of the shock absorber, the assembling method comprising:

inserting the outer tube of the shock absorber into the guide tube after a jack assembly is constituted by mounting the movable spring bearing, the auxiliary spring, the stopper member and the driving mechanism on the outer periphery of the guide tube; and supporting one side end of the suspension spring on the movable spring bearing, pressing the jack assembly against the supporting member by the suspension spring and fixing the jack assembly to the outer tube of the shock absorber.

\* \* \* \* \*